(12) United States Patent
Yao et al.

(10) Patent No.: US 12,504,494 B2
(45) Date of Patent: Dec. 23, 2025

(54) METHOD FOR SELECTIVELY DETECTING MULTIPLE GROUPS AND/OR MOLECULES SIMULTANEOUSLY BY PREPARING MULTIPLE NUCLEAR SPIN SINGLET AND/OR SINGLET ORDERS

(71) Applicant: EAST CHINA NORMAL UNIVERSITY, Shanghai (CN)

(72) Inventors: Yefeng Yao, Shanghai (CN); Daxiu Wei, Shanghai (CN); Xue Yang, Shanghai (CN)

(73) Assignee: EAST CHINA NORMAL UNIVERSITY, Shanghai (CN)

( * ) Notice: Subject to any disclaimer, the term of this patent is extended or adjusted under 35 U.S.C. 154(b) by 172 days.

(21) Appl. No.: 18/681,165

(22) PCT Filed: Jul. 7, 2022

(86) PCT No.: PCT/CN2022/104363
§ 371 (c)(1),
(2) Date: Feb. 5, 2024

(87) PCT Pub. No.: WO2023/280271
PCT Pub. Date: Jan. 12, 2023

(65) Prior Publication Data
US 2025/0231265 A1    Jul. 17, 2025

(30) Foreign Application Priority Data
Jul. 8, 2021    (CN) .......................... 202110774285.4

(51) Int. Cl.
*G01R 33/56* (2006.01)
(52) U.S. Cl.
CPC .............................. *G01R 33/5608* (2013.01)
(58) Field of Classification Search
CPC .................................................. G01R 33/5608
See application file for complete search history.

(56) References Cited

U.S. PATENT DOCUMENTS 7,605,001 B2 * 10/2009 Takasugi ............ G01R 33/4633
324/307
10,802,094 B2 * 10/2020 Stainsby ................ A61B 5/055
(Continued)

FOREIGN PATENT DOCUMENTS

CN    108226835 A    6/2018
CN    110146535 A    8/2019
(Continued)

OTHER PUBLICATIONS

International Preliminary Report on Patentability Chapter I (PCT/IB/373 and PCT/ISA/237), issued in PCT/CN2022/104363, dated Decemter 14, 2023.
(Continued)

*Primary Examiner* — Gregory H Curran
(74) *Attorney, Agent, or Firm* — Birch, Stewart, Kolasch & Birch, LLP

(57) ABSTRACT

A pulse sequence method for realizing selective detection of multiple groups and/or molecules by simultaneously preparing nuclear spin singlets and/or singlet orders of the multiple groups and/or molecules. Taking an AGG molecule as an example, it is proposed to simultaneously prepare two pairs of uncoupled group signals of the AGG molecule into nuclear spin singlets and/or singlet orders, and eliminate magnetic resonance signals other than the nuclear spin singlets and/or singlet orders by using a pulsed gradient field, thereby realizing simultaneous selective observation of multiple group signals in the AGG molecule. Also disclosed is a method for simultaneously detecting group AGG-A in an AGG molecule and group Tau-C and group Tau-D in a Tau molecule. For the first time, the simultaneous preparation and signal selection of multiple nuclear spin singlets and/or singlet orders in a spin system is achieved. Compared with the conventional method, this method has higher sensitivity (Continued)

and better selectivity, and can further expand the application range of magnetic resonance.

20 Claims, 5 Drawing Sheets

(56) References Cited

U.S. PATENT DOCUMENTS

2015/0064113 A1    3/2015  Warren
2020/0158669 A1*  5/2020  Plenio .................... G01N 24/10

FOREIGN PATENT DOCUMENTS

| CN | 113030145 A | 6/2021 |
| CN | 113625210 A | 11/2021 |
| EP | 3 502 728 A1 | 6/2019 |

OTHER PUBLICATIONS

International Search Report, issued in PCT/CN2022/104363, dated Sep. 23, 2022.
Written Opinion of the International Searching Authority, issued in PCT/CN2022/104363, dated Sep. 23, 2022.

* cited by examiner

```
┌─────────────────────────────────────────────────────────────────────┐
│ Obtain the characteristic parameters of the multiple target spin    │
│ systems, such as chemical shifts, coupling constants, etc.          │
└─────────────────────────────────────────────────────────────────────┘
                                    ↓
┌─────────────────────────────────────────────────────────────────────┐
│ Design the pulse sequences to prepare the nuclear spin singlets     │
│ and/or singlet orders and achieve the signal selective observation  │
│ according to the characteristic parameters of the multiple target   │
│ spin systems, such as chemical shifts, coupling constants, etc.     │
└─────────────────────────────────────────────────────────────────────┘
                                    ↓
┌─────────────────────────────────────────────────────────────────────┐
│ Implement the pulse sequences to selectively obtain the magnetic    │
│ resonance signals of the multiple target systems.                   │
└─────────────────────────────────────────────────────────────────────┘
```

FIG.1

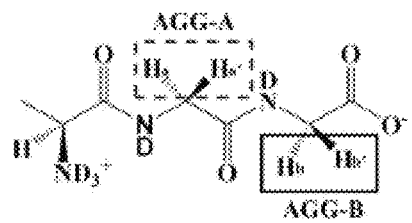

FIG.2

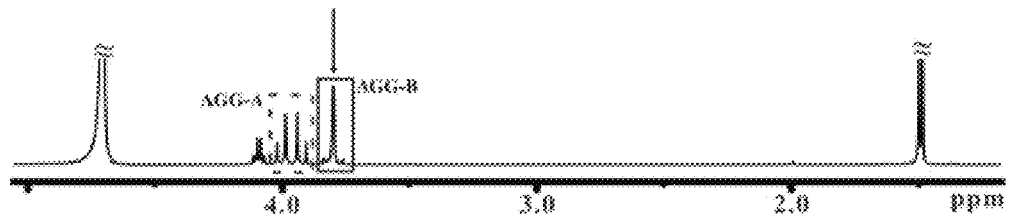

FIG.3

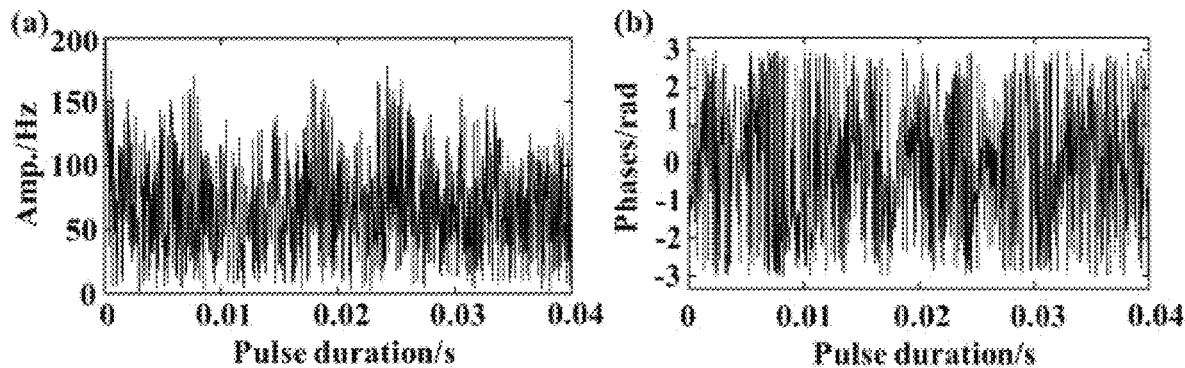

FIG.4

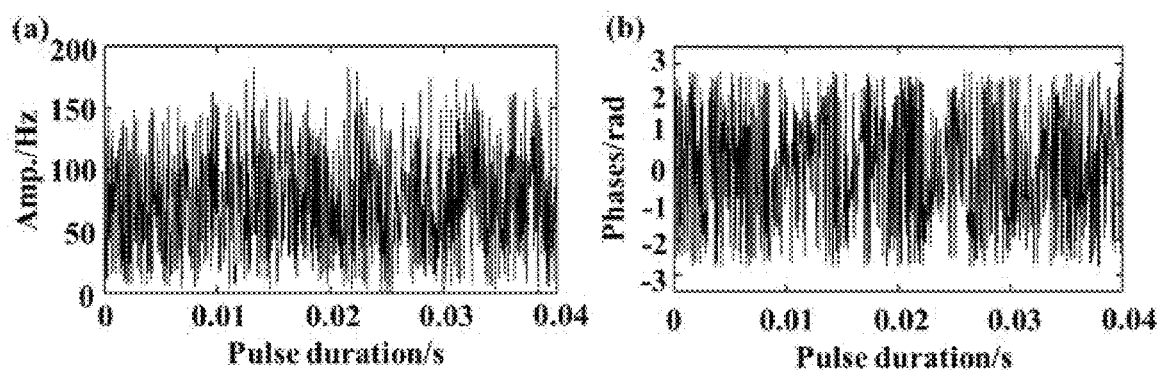
FIG.5
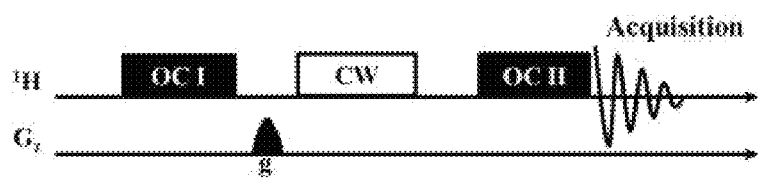
FIG.6
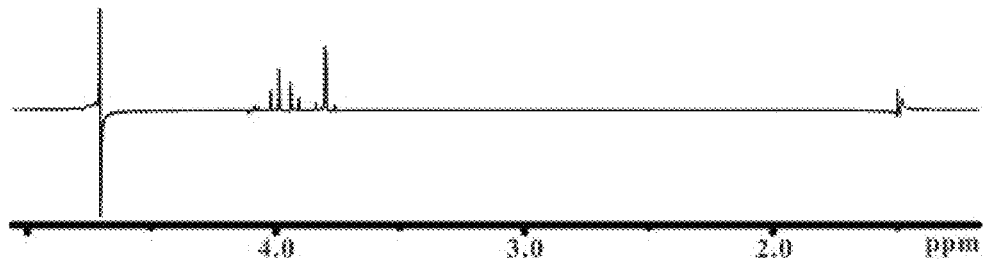
FIG.7
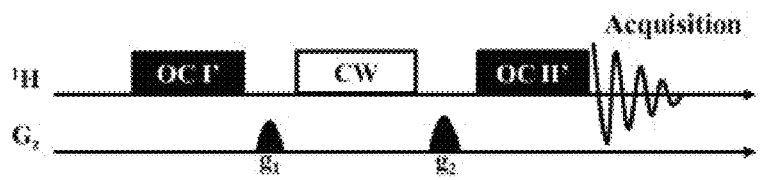
FIG.8
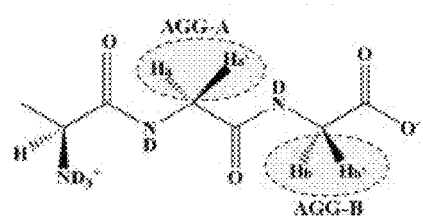 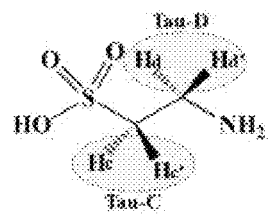 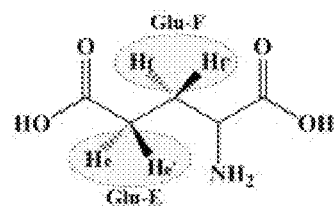
FIG.9

METHOD FOR SELECTIVELY DETECTING MULTIPLE GROUPS AND/OR MOLECULES SIMULTANEOUSLY BY PREPARING MULTIPLE NUCLEAR SPIN SINGLET AND/OR SINGLET ORDERS

TECHNICAL FIELD

The present invention belongs to the technical field of magnetic resonance, and specifically relates to a pulse sequence method for realizing selective detection of multiple groups and/or molecules by simultaneously preparing nuclear spin singlets and/or singlet orders of the multiple groups and/or molecules.

BACKGROUND OF THE INVENTION

The nuclear spin singlet and/or singlet order is a special type of quantum state whose preparation process is closely related to the characteristics of molecular structure. At the same time, the nuclear spin singlets and/or singlet orders are not affected by the external gradient pulses. Based on the above characteristics, the nuclear spin singlets and/or singlet orders can be used as a molecular selective filtering technique: the molecular signal selection is achieved through its preparation process, and the magnetic resonance signals of non-nuclear spin singlets and/or singlet orders in the system are eliminated by applying gradient field pulses at appropriate time, thereby achieving selective observation of a certain group or molecule magnetic resonance signal. However, the existing methods are only applicable for the preparation of nuclear spin singlets and/or singlet orders for an individual group and/or molecule in the system. Therefore, based on the existing methods, selective observation of an individual group and/or molecule signal in the system can only be achieved. The pulse sequence method for realizing selective detection of the multiple groups and/or molecules by simultaneously preparing nuclear spin singlets and/or singlet orders of the multiple groups and/or molecules have not been reported yet.

SUMMARY OF THE INVENTION

Unlike the previous technologies for the nuclear spin singlets and/or singlet orders preparation, the present invention innovatively achieves the simultaneous preparation of nuclear spin singlets and/or singlet orders of the multiple groups and/or molecules, thereby realizing the simultaneous selective detection of the multiple groups and/or molecular magnetic resonance signals. Due to the limitations of the existing techniques for the nuclear spin singlets and/or singlet orders preparation for simultaneously multi-frequency precise excitation of the multiple nuclear spin systems, the existing techniques cannot be directly used for the simultaneous preparation of nuclear spin singlets and/or singlet orders of the multiple groups and/or molecules. In order to solve this problem, the present invention sets reasonable pulse width and initial power, and calculates the numerical pulses with an efficiency higher than 99% through the GRAPE numerical calculation method, the numerical pulses can contain N small pulse units, and each pulse unit has different amplitude and phase value, which solves the problem of the pulse sequence design for simultaneous nuclear spin singlets preparation of multiple groups and/or molecules.

For research systems consisting of multiple complex molecules in practical applications, the method provided in the present invention achieves the simultaneous selective detection of the magnetic resonance signals of the multiple groups and/or molecules. In the application of magnetic resonance spectroscopy, the method provided by the present invention can achieve the selective detection of the molecules/groups with interactions simultaneously. This is of great significance in the study of the interactions between groups and molecules. In magnetic resonance imaging applications, the simultaneous excitation and selection of multiple groups and/or molecular signals can significantly improve the intensity of the measured magnetic resonance signals.

The method provided in the present invention is based on magnetic resonance technology, and has the characteristics of rapid, non-invasive, radiation-free, etc., and can accurately and sensitively measure the signals of multiple specific groups and/or molecules in living organisms. It has important application values in fields such as biology, medicine and others, and is a new innovative technology. The specific technical solutions are as follows:

The invention provides a method for simultaneously preparing and selectively detecting nuclear spin singlets and/or singlet orders of the multiple groups and/or molecules, said method realizes precise excitation of multi-frequency magnetic resonance signals by utilizing optimization control methods, realizes the simultaneous selective detection of the magnetic resonance signals of the multiple groups and/or molecules by simultaneously preparing the nuclear spin singlets and/or singlet orders of the multiple groups and/or the molecules, said method comprises the following core steps:

Step i: simultaneously converting multiple groups and/or molecules from a thermal equilibrium state into a singlet and/or singlet orders through the RF pulses;

Step ii: eliminating the non-singlet and/or non-singlet orders signals in the system by applying the gradient field;

Step iii: simultaneously converting the nuclear spin singlets and/or singlet orders of the multiple groups and/or molecules into the observable states and collecting magnetic resonance signals, and realizing simultaneous selective observation of the multiple groups and/or molecules.

The method of the present invention can achieve the simultaneous selective detection of the magnetic resonance signals of multiple groups and/or molecules.

Said groups are selected from group AGG-A and group AGG-B of the alanine-glycine-glycine (AGG) molecules and group Tau-C and group Tau-D of the taurine (Tau) molecules, etc.

Said molecules are selected from the AGG molecule and the taurine (Tau) molecule, etc.

In said step i, the numerical pulses with an efficiency higher than 99% are obtained through the GRAPE numerical calculation method, the m (m≤N/2) pairs of spins in a nuclear spin system containing N spin quantum numbers of ½ are simultaneously converted into the nuclear spin singlets and/or singlet order, that is, the state of the m pairs of spins in the system being converted from the thermal equilibrium state of $I_z^1 + I_z^2 + \ldots + I_z^{2m}$ into the state of $2I_x^1 I_x^2 + 2I_y^1 I_y^2 + 2I_x^3 I_x^4 + 2I_y^3 I_y^4 + \ldots + 2I_x^{2m-1} I_x^{2m} + 2I_y^{2m-1} I_y^{2m}$.

In Step ii, the pulsed gradient field is used to eliminate or suppress the signals other than the nuclear spin singlets and/or singlet orders, realizing selective observation of the multiple nuclear spin singlets and/or singlet orders. Adjusting the intensities, the application times and the positions of the gradient field pulses can realize the optimization of the selective observation of the multiple singlet magnetic resonance signals.

In Step iii, by applying the reasonably designed pulses, the m pairs of spins in the nuclear spin singlets and/or singlet orders are converted from the state of $2I_x^1I_x^2+2I_y^1I_y^2+2I_x^3I_x^4+2I_y^3I_y^4+ \ldots +2I_x^{2m-1}I_x^{2m}+2I_y^{2m-1}I_y^{2m}$ into the state of $I_{x/y}^1+I_{x/y}^2+ \ldots +I_{x/y}^{2m}$, and the magnetic resonance signals are collected to obtain the magnetic resonance signals of the specific groups and/or molecules.

In addition, the present invention may also include the following basic steps: (1) locating the area to be measured in living organisms by the conventional magnetic resonance imaging technology. (2) if necessary, the spectra of the measured region are collected by conventional nuclear magnetic resonance spectroscopy technology, magnetic resonance imaging (MRI) technology and magnetic resonance spectroscopy (MRS) technology.

Said pulse sequences of the present invention include the preparation and detection pulse sequence for simultaneously preparing the nuclear spin singlets and/or singlet orders of different groups in a molecule, the preparation and detection pulse sequence for simultaneously preparing the nuclear spin singlets and/or singlet orders of different molecules, the multiple signals selective magnetic resonance spectroscopy pulse sequence for the same molecule, and the multiple signals selective magnetic resonance imaging pulse sequence for the same molecule.

The pulse sequences involved in the present invention generally include the preparation pulse module for the nuclear spin singlets and/or singlet orders and the conversion pulse module for the nuclear spin singlets and/or singlet orders. FIG. 4 shows an example of the pulse module (OCI) for simultaneously preparing the nuclear spin singlets of group AGG-A and group AGG-B in the AGG molecules. Wherein, FIG. 4(a) shows the pulse amplitude curve of OCI, and FIG. 4(b) shows the phase curve of OCI. Wherein, OCI converts the H spins of group AGG-A and group AGG-B in the AGG molecules from the thermal equilibrium state into the singlet state. FIG. 5 shows an example of the pulse module (OCII) designed by using the optimization control and numerical calculation method to simultaneously convert the nuclear spin singlets of group AGG-A and group AGG-B in the AGG molecules. Wherein, FIG. 5(a) shows the pulse amplitude curve of OCII and FIG. 5(b) shows the phase curve of OCII. Wherein, OCII converts the nuclear spin singlets of group AGG-A and group AGG-B in the AGG molecules into the observable states.

FIG. 6 shows the pulse sequences for simultaneously preparing and converting the singlet states of different groups in the AGG molecules, said sequences include the pulse module OCI, the pulse module OCII, the pulsed gradient field g and the continuous wave CW decoupling pulse; said pulse module OCI is used to simultaneously convert the spin system composed of the H atoms in different groups in the same molecule from the thermal equilibrium states into the nuclear spin singlets; said pulse module OCII is used to simultaneously convert the nuclear spin singlets prepared by the pulse module OCI into the observable state; said pulsed gradient field g is used to eliminate or suppress the signals other than the nuclear spin singlets and/or the singlet orders; said continuous wave CW decoupling pulse is used to preserve the singlets. The pulse sequence can be described as follows: firstly, OCI is applied to simultaneously convert the H spins of group AGG-A and group AGG-B in the AGG molecules from the thermal equilibrium states into the nuclear spin singlets. The pulsed gradient field g is applied after OCI. The application time and intensity of the pulsed gradient field g are optimized according to specific situations. The CW decoupling pulse can be applied after the gradient pulse to preserve the singlet states. OCII is applied after the CW decoupling pulse. OCII converts the nuclear spin singlets prepared by OCI into the observable states simultaneously. Finally, the magnetic resonance signals acquisition is carried out to obtain the magnetic resonance signals of group AGG-A and group AGG-B simultaneously.

FIG. 8 shows the pulse sequence for simultaneously preparing and converting the nuclear spin singlets of the AGG molecules and Tau molecules, achieving the selective observation of the AGG molecules and Tau molecules simultaneously. The sequences include the pulse module OCI', the pulse module OCII', the pulsed gradient field $g_1$ and $g_2$, and the continuous wave CW decoupling pulse; said pulse module OCI' is used to convert the spin system composed of H atoms in different groups in different molecules from the thermal equilibrium states into the nuclear spin singlet orders; said pulse module OCII' is used to simultaneously convert the nuclear spin singlets and/or singlet orders prepared by the pulse module OCI' into the observable states; said pulsed gradient field $g_1$ and $g_2$ are used to eliminate or suppress the signals other than the nuclear spin singlets and/or singlet orders; said continuous wave CW decoupling pulse is used to preserve the singlets. The pulse sequence can be described as follows: firstly, OCI' is applied to convert the two-spin system composed of groups AGG-A in the AGG molecules from the thermal equilibrium state into the nuclear spin singlets and convert the four-spin system composed of groups Tau-C and groups Tau-D in the Tau molecules from the thermal equilibrium state into the nuclear spin singlet orders. The pulsed gradient field $g_1$ is applied after OCI'. The application time and intensity of the pulsed gradient field $g_1$ are optimized according to the specific situations. The CW decoupling pulse can be applied after the pulsed gradient field $g_1$. After the CW decoupling pulse, the pulsed gradient field $g_2$ is applied, and the application time and intensity of the pulsed gradient field $g_2$ are optimized according to the specific situations. Finally, OCII' is applied. OCII' converts the nuclear spin singlets and the singlet orders prepared by OCI' into the observable states simultaneously. Finally, the magnetic resonance signals acquisition is carried out, and the magnetic resonance signals of group AGG-A, group Tau-C and group Tau-D are obtained simultaneously.

The present invention also provides an MRS method for simultaneously detecting nuclear spin singlets and/or singlet orders in the multiple spin system of the same molecule, achieving selective observation of multiple molecules and/or groups simultaneously. Said pulse sequence as shown in FIG. 13 includes the pulse module OCI, the pulse module OCII, the pulsed gradient field $g_1/g_2/g_3$, the continuous wave CW decoupling pulse, the 90° hard pulse with the phase in the y direction, the soft pulse of sinc waveform with the phase in the x direction, and the layer selection gradient $G_z$; said pulse module OCI is used to convert the spin system composed of H atoms in different groups in the same molecule from the thermal equilibrium state into the nuclear spin singlets simultaneously; said pulse module OCII is used to simultaneously convert the nuclear spin singlets prepared by the pulse module OCI into the observable state in the x direction; said pulsed gradient fields $g_1/g_2/g_3$ are used to eliminate or suppress the signals other than nuclear spin singlets and/or singlet orders; said continuous wave CW decoupling pulse is used to preserve the singlets; said 90° hard pulse with the phase in the y direction converts the observable state after the action of the pulse module OCII into the longitudinal magnetization; said soft pulse of sinc waveform and the layer selection gradient field $G_z$ are simultaneously applied for layer selection excitation of the spin system in the longitudinal magnetization. Said pulse module OCI converts the H spins of AGG-A and AGG-B from the thermal equilibrium states into the nuclear spin singlets simultaneously, and the pulse module OCII converts the nuclear spin singlets prepared by the pulse module OCI into the observable state simultaneously. Then the 90° hard pulse is applied to convert the observable state into the thermal equilibrium state. Finally, the magnetic resonance signals are collected by traditional magnetic resonance spectroscopy technology, and the magnetic resonance spectrum signals of group AGG-A and group AGG-B are obtained at the same time. According to the experimental phenomena, adjusting the intensities, the application times and the position of the gradient field pulses realizes the optimization of the selective observation of the magnetic resonance signals of group AGG-A and group AGG-B.

Said layer selection gradient $G_z$ is a linear gradient field.

The present invention also provides an MRS method for preparing the nuclear spin singlets in the group AGG-B spin system, thereby selectively detecting the AGG molecular signals. The pulse sequence is as shown in FIG. 14: the pulse module OCIII converts the H spins in group AGG-B in the AGG molecule from the thermal equilibrium states into the nuclear spin singlets, and the pulse module OCIV converts the nuclear spin singlets prepared by the pulse module OCIII into the observable state. Then the 90° hard pulse is applied to convert the observable state into the thermal equilibrium state. Finally, the magnetic resonance signals are collected by conventional magnetic resonance spectroscopy technology to obtain the magnetic resonance spectrum signals of group AGG-B. Adjusting the intensity, the application times and the position of the gradient field pulses realizes the optimization of the selective observation of the magnetic resonance signals of group AGG-B.

The present invention also provides an MRI method for simultaneously detecting the nuclear spin singlets and/or singlet orders in the multiple spins system of the same molecule, achieving selective observation of the multiple molecules and/or groups simultaneously. The pulse sequence as shown in FIG. 15 includes the pulse module OCI, the pulse module OCII, the pulsed gradient field g, the continuous wave CW decoupling pulse, the phase coding gradient $G_y$, the π refocusing pulse, the linear gradient field $G_x'$ (dephasing wave), the linear gradient field $G_x$ (rephasing wave); said pulse module OCI is used to simultaneously convert the spin system composed of the H atoms in different groups in the same molecule from the thermal equilibrium state into the nuclear spin singlets; said pulse module OCII is used to simultaneously convert the nuclear spin singlets prepared by the pulse module OCI into the observable state in the x direction; said pulsed gradient field g is used to eliminate or suppress the signals other than the nuclear spin singlets and/or singlet orders; said continuous wave CW decoupling pulse is used to preserve the singlets; said phase coding gradient $G_y$ makes the H spins in the phase coding direction have different phases, thus determining the positions of different magnetic resonance signal sources along the phase coding direction; said dephasing wave $G_x'$ is applied before the π refocusing pulse to obtain a positive phase difference, said phase difference remains unchanged before the π refocusing pulse is applied; said π refocusing pulse is a 180° pulse applied in the x direction, used to flip the phase difference obtained by the dephasing wave $G_x'$ to the negative direction, and then the phase difference remains unchanged; meanwhile, the π refocusing pulse is also used to compensate for the phase loss caused by the external magnetic field and the chemical shifts non-uniformity; said rephasing wave $G_x$ is used to return the spin to the same phase, and said phase difference becomes zero at the echo time TE, followed by the phase difference occurring again. Said dephasing wave $G_x'$ and said rephasing wave $G_x$ together form a complete frequency coding gradient, so that the H spins in the frequency coding direction have different frequencies. The pulse module OCI simultaneously converts the H spins of group AGG-A and group AGG-B from the thermal equilibrium states into the nuclear spin singlets, and the pulse module OCII converts the nuclear spin singlets prepared by the pulse module OCI into the observable states simultaneously. Then the magnetic resonance signals are collected by conventional magnetic resonance imaging technology, and the magnetic resonance imaging signals of group AGG-A and group AGG-B are obtained simultaneously. Adjusting the intensities, the application times and the positions of the gradient field pulses realize the optimization of the selective observation of the magnetic resonance signals of group AGG-A and group AGG-B.

The present invention also provides an MRI method for preparing the nuclear spin singlets in the group AGG-B spin system, realizing selective observation of the AGG molecules. The pulse sequence is as shown in FIG. 16: the pulse module OCIII converts the H spins in group AGG-B in the AGG molecule from the thermal equilibrium states into the nuclear spin singlets, and the pulse module OCIV converts the nuclear spin singlets prepared by the pulse module OCIII into the observable state. Then the magnetic resonance signals are collected by traditional magnetic resonance imaging technology to obtain the magnetic resonance imaging signals of group AGG-B. According to the actual experimental situation, adjusting the intensities, the application times and the positions of the pulsed gradient field realizes the optimization of the selective observation of the magnetic resonance imaging signals of group AGG-B.

In the pulse sequence as shown in FIG. 6, the application time of the pulse module OCI is 230 ms and the power is 29.45 dB, the application time of the pulse module OC II is 230 ms and the power is 29.45 dB. The duration of the gradient pulse g is 1.3 ms, and the intensity of the gradient pulse g is 6.8 mT/cm. The time of the CW decoupling pulse is adjustable.

In the pulse sequence as shown in FIG. 8, the application time of the pulse module OCI' is 100 ms and the power is 29.65 dB, the application time of the pulse module OCII' is 100 ms and the power is 29.65 dB. The duration of the gradient pulse $g_1$ is 1 ms and the intensity of the gradient pulse is 2.4 mT/cm, the duration of the gradient pulse $g_2$ is 1 ms and the intensity of the gradient pulse is 7 mT/cm. The time of the CW decoupling pulse is adjustable.

In the pulse sequence as shown in FIG. 13, the application time of the pulse module OCI is 230 ms and the power is 29.10 dB, the application time of the pulse module OCII is 230 ms and the power is 29.10 dB. The duration of the gradient pulse $g_1$ is 1.1 ms and the intensity of the gradient pulse is 2.2 mT/cm, the duration of the gradient pulse $g_2$ is 1.1 ms and the intensity of the gradient pulse is 4.4 mT/cm, the duration of the pulsed gradient field $g_3$ is 1 ms and the intensity of the gradient pulse is 6.6 mT/cm, the application time of 90° hard pulse with the phase in the y direction is 9.4 µs and the power is −13.38 dB; the application time of the soft pulse with sinc waveform is 1 ms, and the power is 36.31 mW; the application time of the layer selection gradient $G_z$ is 1 ms and the power is 0.1 mT/cm.

In the pulse sequence as shown in FIG. 14, the application time of the pulse module OCIII is 180 ms and the power is 28.08 dB, the application time of the pulse module OCIV is 180 ms and the power is 28.08 dB. The duration of the gradient pulse $g_1$ is 1.1 ms and the intensity of the gradient pulse is 2.2 mT/cm, the duration of the gradient pulse $g_2$ is 1.1 ms and the intensity of the gradient pulse is 4.4 mT/cm, the duration of the gradient pulse $g_3$ is 1 ms and the intensity of the gradient pulse is 6.6 mT/cm, the application time of the 90° hard pulse with the phase in the y direction is 9.4 µs and the power is −13.38 dB; the application time of the soft pulse with sinc waveform is 1 ms, and the power is 36.31 mW, the application time of the layer selection gradient $G_z$ is 1 ms and the power is 0.1 mT/cm.

In the pulse sequence as shown in FIG. 15, the application time of the pulse module OCI is 230 ms and the power is 32.7 dB, the application time of the pulse module OCII is 230 ms and the power level is 32.7 dB. The duration of the gradient pulse g is 1.1 ms, and the intensity of the gradient pulse is 8.8 mT/cm. The duration of the phase coding gradient $G_y$ is 3.09 ms, and the maximum intensity is 1.6 mT/cm; the duration of the dephasing gradient $G_x'\, t_{Gx}$=3.27 ms, and the intensity is 4.9 mT/cm, the application time of the π refocusing pulse is 18.8 µs and the power is −13.38 dB; the application time of the rephasing wave $G_x\, t_{Gx}$=6.53 ms, and the intensity is 4.9 mT/cm; the repetition time TR=4.47 s, the echo time TE=9.65 ms, the field of view FOV=(5.8× 5.8) mm², the resolution is 45×45 µm², 305×305 matrix.

In the pulse sequence as shown in FIG. 16, the application time of the pulse module OCI is 180 ms and the power is 32.7 dB, the application time of the pulse module OCII is 180 ms and the power is 32.7 dB. The duration of the gradient pulse g is 1.1 ms, and the intensity of the gradient pulse is 8.8 mT/cm. The application time of the phase coding gradient $G_y$ is 3.09 ms, and the maximum intensity is 1.6 mT/cm; the application time of the dephasing gradient pulse $G_x'\, t_{Gx}$=3.27 ms, and the intensity is 4.9 mT/cm; the application time of the π refocusing pulse is 18.8 µs and the power is −13.38 dB; the application time of the rephasing wave $G_x\, t_{Gx}$=6.53 ms, and the intensity is 4.9 mT/cm; the repetition time TR=4.42 s, the echo time TE=9.65 ms, the field of view FOV=(5.8×5.8) mm², the resolution is 45×45 µm², 305×305 matrix.

The above experimental parameters are optimized according to the actual situation.

The invention provides a method for simultaneously preparing the nuclear spin singlets and/or singlet orders of different groups in a molecule, thereby achieving selective observation of the magnetic resonance signals of different groups simultaneously. Taking group AGG-A and group AGG-B in the AGG molecule as an example, said method specifically includes the following steps:

1. The sample is an AGG molecular deuterium aqueous solution with a concentration of 570 mmol/L and a pH value of 12. The molecular structure of AGG is shown in FIG. 2. By applying the 90° pulse, the single pulse $^1$H spectrum of the solution sample can be obtained as shown in FIG. 3, the spectrum includes the water signals, the methyl signals of the AGG molecules and the H spins signals in the AGG molecules. The magnetic resonance signals in the dashed box in the spectrum are from the H spins $H_{aa'}$ in group AGG-A, and the magnetic resonance signals in the solid box in the spectrum are from the H spins $H_{bb'}$ in group AGG-B. The magnetic resonance signals of group AGG-A and group AGG-B can be classified as follows: the center frequency of the magnetic resonance signals of group AGG-B is set to 0 (as shown by the arrow in FIG. 3), the center frequency of the magnetic resonance signals of group AGG-A is 0.16 ppm, and the J-coupling value between the two H spins of group AGG-A is 17.2 Hz, and the J-coupling value between the two H spins of group AGG-B is 17.7 Hz.

2. Apply the pulse sequence as shown in FIG. 6 for preparing and converting the multiple singlets. The experimental results are shown in FIG. 7. The spectrum includes the water signals and the magnetic resonance signals of group AGG-A and group AGG-B in the AGG molecules. Compared with FIG. 3, in FIG. 7, there are only the magnetic resonance signals of group AGG-A and group AGG-B, as well as the water peak signals that are greatly suppressed. This demonstrates that the application of the above pulse sequence can achieve the simultaneous selective detection of group AGG-A and group AGG-B signals.

The present invention provides a method for preparing the singlets and/or singlet orders of different molecular spin systems, thereby achieving the selective observation of the magnetic resonance signals of different groups simultaneously. Take group AGG-A in the AGG molecule and group Tau-C and group Tau-D in the Tau molecular as examples.

Said method specifically includes the following steps:
1. The sample is a deuterium aqueous solution of the AGG molecules, the Tau molecules and the Glu molecules, with a concentration of 86.4 mmol/L and a pH value of about 12. The molecular structures are shown in FIG. 9. The pulse was applied to obtain the single pulse $^1$H spectrum of the solution sample shown in FIG. 10(*a*). The attribution of some signals in the spectrum has been marked as corresponding to the peaks and the molecular structures. The magnetic resonance signals of group AGG-A, group Tau-C and group Tau-D can be classified as follows: the center frequency of the magnetic resonance signals of group Tau-C and group Tau-D is set to 0 (as shown by the arrow in FIG. 10(*a*)), the center frequency of the magnetic resonance signals of group AGG-A is 0.702 ppm, the center frequency of the magnetic resonance signals of group Tau-C is 0.085 ppm, the center frequency of the magnetic resonance signals of group Tau-D is −0.085 ppm, the J-coupling value between the two H spins of group AGG-A is 17 Hz, the J-coupling value between the two H spins of group Tau-C is 6.6 Hz, and the J-coupling value between the two H spins of group Tau-D is 6.6 Hz.

2. Apply the pulse sequence shown in FIG. 8 to prepare and convert the singlets. The experimental results are shown in FIG. 10(*b*). The spectrum includes the water signals, the signals from group AGG-A in the AGG molecule, and the magnetic resonance signals of group Tau-C and group Tau-D of the Tau molecule. Compared with FIG. 10(*a*), only the magnetic resonance signals of group AGG-A, group Tau-C and group Tau-D, as well as the water peak signals that are significantly suppressed, are present in FIG. 10(*b*). This indicates that the application of the above pulse sequences can achieve simultaneous selective detection of the magnetic resonance signals in the spin systems of different molecules.

The present invention also provides a magnetic resonance imaging method by combining the method of the present invention with conventional magnetic resonance spectroscopy and conventional magnetic resonance imaging to achieve selective observation of the magnetic resonance signals of multiple specific molecules and/or groups.

Said method specifically includes the following steps:
1. The schematic diagram of the sample is shown in FIG. 11. The exterior is a standard nuclear magnetic tube. The tube contains a mixed solution of $H_2O$ and $D_2O$, with a capillary containing a deuterium solution of the AGG molecule (with a concentration of 570 mmol/L) inside. FIG. 12 shows the single pulse $^1H$ spectrum of the solution sample, which includes the water signals and the H spins signals in the AGG molecules. The magnetic resonance signals in the dashed box in the spectrum come from group AGG-A, while the magnetic resonance signals in the solid box in the spectrum come from group AGG-B.
2. FIG. 13 shows the MRS pulse sequence used in the experiment of the present invention for selective observation of the magnetic resonance signals of group AGG-A and group AGG-B in the AGG molecules simultaneously. FIG. 14 shows the MRS pulse sequence used in the experiment of the present invention for selective observation of the magnetic resonance signals of group AGG-B in the AGG molecules. FIG. 17(a) shows the MRS spectrum obtained by applying the pulse sequence shown in FIG. 13 to the sample shown in FIG. 11. Compared with FIG. 12, the magnetic resonance signals of group AGG-A and group AGG-B are mainly shown in FIG. 17(a). FIG. 17(b) shows the MRS spectrum obtained by applying the pulse sequence shown in FIG. 14 to the sample shown in FIG. 11. Compared with FIG. 12, only the magnetic resonance signals of group AGG-B are present in FIG. 17(b).
3. FIG. 15 shows the MRI pulse sequence used in the experiment of the present invention for selective observation of the magnetic resonance signals of group AGG-A and group AGG-B in the AGG molecules simultaneously. FIG. 16 shows the MRI pulse sequence used in the experiment of the present invention for selective observation of the magnetic resonance signal of group AGG-B of the AGG molecule. FIG. 18(a) shows the MRI image obtained by applying the pulse sequence shown in FIG. 15 to the sample shown in FIG. 11. The white dashed lines in the figure represent the outline of the nuclear magnetic tube, and the area within the white rectangular solid line frame is used for signal intensity comparison. The small white solid circle is the signal of the liquid in the capillary inside the nuclear magnetic tube. Because the AGG molecules only exist in the capillary, only small white solid circle appears in FIG. 18(a) by applying the pulse sequence in FIG. 15. FIG. 18(b) shows the MRI image obtained by applying the pulse sequence shown in FIG. 16 to the sample shown in FIG. 11. Similarly, the white dashed lines in the figure represent the outline of the nuclear magnetic tube, and the area within the solid white rectangular solid line box is used for signal intensity comparison. The small white solid circle is the signal of the liquid in the capillary inside the nuclear magnetic tube. By applying the pulse sequence in FIG. 16, only the small solid white circle appears in FIG. 18(b). Because the signals of the small white solid circle in FIG. 18(a) come from group AGG-A and group AGG-B, while the signal in FIG. 18(b) only comes from group AGG-B, the signal of the small white solid circle in FIG. 18(b) is significantly weaker than that of the small white solid circle in FIG. 18(a).

FIG. 19 compares the magnetic resonance signal intensity between FIG. 18(a) and FIG. 18(b). The selected comparison area is shown in the solid box in FIG. 18. By comparison, it is found that when preparing a singlet for imaging by simultaneously selecting group AGG-A and group AGG-B signals, the signal intensity is about twice that of imaging by only selecting group AGG-B signal. This clearly demonstrates that simultaneous preparation of the singlet signals of multiple groups can achieve an enhancement of the molecular selective magnetic resonance imaging signals.

The significant features and innovations that differentiate the present invention from the other signal selective detection methods using singlets in the past are that: the present invention breaks through the limitation of the previous pulse methods that can only prepare the nuclear spin singlets and/or singlet orders for a single group and/or a molecule, innovatively utilizes the feature of the optimized control method to accurately excite the nuclear spins at multifrequency simultaneously, solves the difficulties in the pulse sequence design for simultaneously preparing the nuclear spin singlets and/or singlet orders for multiple groups and/or molecules, achieves the simultaneous preparation of the nuclear spin singlets and/or singlet orders of multiple groups and/or molecules, thereby achieves simultaneous selective observation of the magnetic resonance signals for the multiple groups and/or molecules. Conversion and correlation studies can be carried out between the multiple singlets prepared by this method. The method provided by the present invention has important application values in fields such as chemistry, biology, medicine and others.

DESCRIPTION OF DRAWINGS

FIG. 1 shows a schematic diagram of the main steps and flow of the embodiments of the present invention.

FIG. 2 shows the molecular structure of AGG of the present invention

FIG. 3 shows the single pulse $^1H$ spectrum of the deuterium aqueous solution of the AGG molecules of the present invention. The magnetic resonance signals in the dashed frame in the spectrum come from group AGG-A, and the magnetic resonance signals in the solid frame in the spectrum come from group AGG-B.

FIG. 4 shows the curves of the pulse amplitude and the phase of the optimized singlet preparation pulse module (OCI) of the present invention as a function of pulse time.

FIG. 5 shows the variation curve of the pulse amplitude and the phase of the optimized singlet conversion pulse module (OCII) of the present invention as a function of pulse time.

FIG. 6 shows the pulse sequence of the present invention for preparing and converting multiple singlets in the same molecule.

FIG. 7 shows the spectrum obtained by collecting samples after applying the pulse sequence shown in FIG. 6 of the present invention. The spectrum includes the water signals and the magnetic resonance signals of group AGG-A and group AGG-B in the AGG molecules. Compared with the H spins magnetic resonance signals of the AGG molecules in the single-pulse $^1H$ spectrum shown in FIG. 3, in FIG. 7, group AGG-A and group AGG-B magnetic resonance signals are kept simultaneously, while the water peak signals are well suppressed.

FIG. 8 shows the pulse sequence of the present invention for simultaneously preparing and converting multiple singlets in different molecules.

FIG. 9 shows the molecular structures of AGG, Tau and Glu.

FIG. 10(*b*) shows the spectrum obtained by collecting samples after applying the pulse sequence in FIG. 8. The spectrum includes the water signals, the signals of group AGG-A in the AGG molecule, and the magnetic resonance signals of group TAU-C and group TAU-D in the Tau molecule. Compared with FIG. 10(*a*), only the magnetic resonance signals of group AGG-A, group Tau-C and group Tau-D and the water signals that are significantly suppressed are present in FIG. 10(*b*).

FIG. 17(*b*) shows the MRS spectrum obtained by applying the pulse sequence in FIG. 14 to the sample shown in FIG. 11. Only group AGG-B magnetic resonance signal is present in the spectrum.

FIG. 18(*b*) shows the MRI image obtained by applying the pulse sequence in FIG. 16 to the sample shown in FIG. 11. The white dashed line in the figure represents the outline of the nuclear magnetic tube, and the area within the white rectangular solid frame is used for signal intensity comparison. The small white solid circle is the signal of AGG deuterium aqueous solution in the capillary inside the nuclear magnetic tube.

PREFERRED EMBODIMENTS OF THE INVENTION

Figure 10:
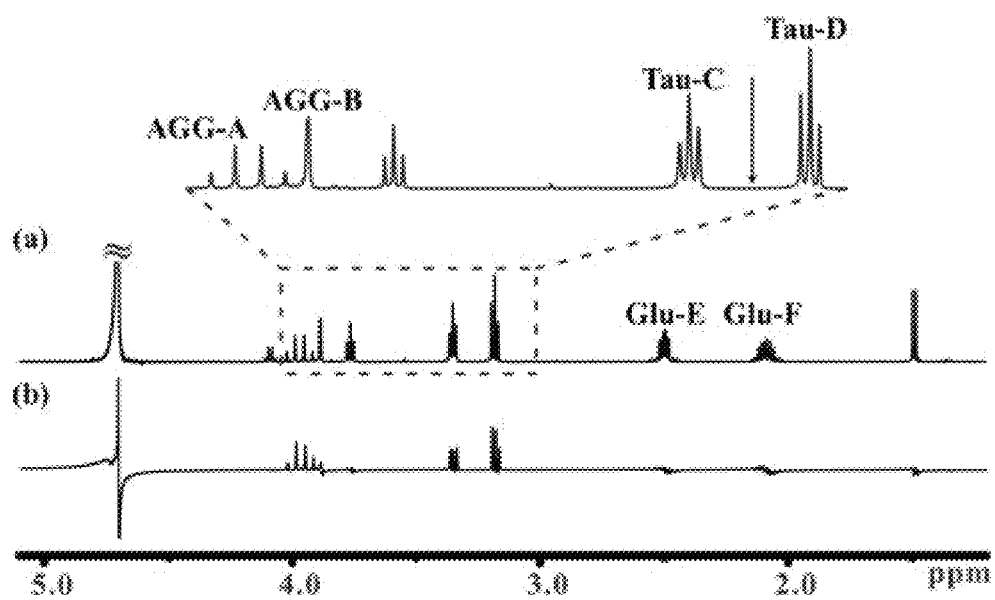
FIG. 10(*a*) shows the single pulse $^1$H spectrum of the mixture in FIG. 9.

In combination with the following specific examples and drawings, the following examples are given to further illustrate the specific solutions of the present invention. The process, conditions, experimental methods, and so on for implementing the present invention are general and common knowledge in the field except for the contents specifically mentioned below, and the present invention has no special limitation.

The main steps of the embodiment of the present invention are shown in FIG. 1:

Step 1: obtain the characteristic parameters of the multiple target spin systems such as chemical shifts, coupling constants, etc.

Step 2: Design the pulse sequences to prepare the nuclear spin singlets and/or singlet orders and achieve the signal selective observation according to the characteristic parameters of the multiple target spin systems such as chemical shifts, coupling constants, etc.

Step 3: Implement the pulse sequence to selectively obtain the magnetic resonance signals of the multiple target systems simultaneously.

Example 1

Simultaneously preparing H spin singlet to detect singlet signals for group AGG-A and group AGG-B in the AGG molecules (the Bruker AVANCE III 500 nuclear magnetic resonance instrument was used), the sample in this example was the deuterium aqueous solution of the AGG molecules. The Specific Steps are as Follows:

A 90° pulse was applied to obtain the single-pulse $^1$H spectrum of the solution sample as shown in FIG. 3. Calibrated to TMS. The magnetic resonance signals shown in FIG. 3 are attributed as follows: the chemical shift of the water peak is 4.70 ppm, the chemical shift of group AGG-A is 3.95 ppm, the chemical shift of group AGG-B is 3.79 ppm, the chemical shift of the methyl proton in the AGG molecule is 1.48 ppm, and the chemical shift of the hydrogen spins H in the AGG molecule is 4.08 ppm. The J-coupling value between the two H spins of group AGG-A is 17.2 Hz, and the J-coupling value between the two H spins of group AGG-B is 17.7 Hz.

Apply the pulse sequence for the preparation and conversion of singlets as shown in FIG. 6. The experimental results are shown in FIG. 7.

The spectrum includes the water signals and the magnetic resonance signals of group AGG-A and group AGG-B in the AGG molecules. Compared with FIG. 3, in FIG. 7, only the magnetic resonance signals of group AGG-A and group AGG-B, as well as the water peak signals that are significantly suppressed, are present. It indicates that the simultaneous selective detection of group AGG-A and group AGG-B can be achieved by applying the above pulse sequences.

The optimal experimental parameters in the present invention are as follows, the application time of the multiple singlet preparation pulse OCI is 230 ms, and the power is 29.45 dB. The duration of the gradient pulse g is 1.3 ms, and the intensity of the gradient pulse is 6.8 mT/cm. The time of the decoupling pulse is adjustable. The application time of the multiple singlet observation pulse OCII is 230 ms and the power is 29.45 dB.

Example 2

Simultaneously preparing the singlets and singlet orders of the two-spin system composed of group AGG-A of the AGG molecules and the four-spin system composed of group Tau-C and group Tau-D in the Tau molecule to detect singlet and singlet order signals (the Bruker AVANCE III 500 nuclear magnetic resonance instrument was used), the sample in this example was the deuterium aqueous solution of the AGG molecule, the Tau molecule and the Glu molecule.

The Specific Steps are as Follows:

A 90° pulse was applied to obtain the single-pulse $^1$H spectrum of the solution sample shown in FIG. 10(a). Calibrated to TMS. The magnetic resonance signals shown in FIG. 10(a) are as follows: the chemical shift of the water peak is 4.70 ppm, the chemical shift of group AGG-A is 3.97 ppm, the chemical shift of group AGG-B is 3.88 ppm, the chemical shift of group Tau-C is 3.35 ppm, and the chemical shift of group Tau-D is 3.18 ppm. The J-coupling value between the two H spins of group AGG-A is 17 Hz, the J-coupling value between the two H spins of Tau-C is 6.6 Hz, and the J-coupling value between the two H spins of Tau-D is 6.6 Hz.

Apply the pulse sequence for the preparation and conversion of singlets shown in FIG. 8. The experimental results are shown in FIG. 10(b). The spectrum includes the water signals, the signals of group AGG-A in the AGG molecule, and the signals of group Tau-C and group Tau-D in the Tau molecule. Compared with FIG. 10(a), in FIG. 10(b), only the magnetic resonance signals of group AGG-A, group Tau-C, and group Tau-D, as well as the water peak signals that are significantly suppressed, are present. It indicates that the simultaneous selective detection of the magnetic resonance signals in the spin systems of the different molecules can be achieved by applying the above pulse sequence.

The optimal experimental parameters in the present invention are as follows, the application time of the multiple singlet preparation pulse OCI' is 100 ms, and the power is 29.65 dB. The duration of the gradient pulse $g_1$ is 1 ms, and the intensity of the gradient pulse is 2.4 mT/cm. The time of the decoupling pulse is adjustable. The duration of the gradient pulse $g_2$ is 1 ms, and the intensity of the gradient pulse is 7 mT/cm. The application time of the multiple singlet observation pulse OCII' is 100 ms and the power is 29.65 dB.

Example 3

Figure 11:
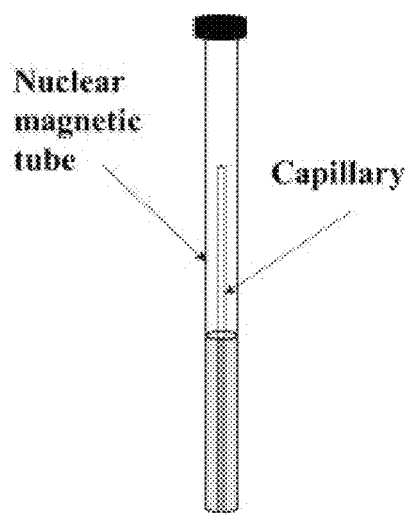
FIG. 11 shows a schematic diagram of the sample used in Example 3 of the present invention, wherein, inside the nuclear magnetic tube, there is a mixed solution of $H_2O$ and $D_2O$, equipped with a capillary containing a deuterium solution of AGG molecules inside.

The method of the present invention is combined with the conventional magnetic resonance spectroscopy technology and conventional magnetic resonance imaging technology separately to achieve the enhancement of the magnetic resonance signals (the Bruker AVANCE III 500 nuclear magnetic resonance instrument was used), the sample used in this example is shown in FIG. 11, wherein the nuclear magnetic tube contains a mixed solution of $H_2O$ and $D_2O$, equipped with the capillary containing the deuterium aqueous solution of the AGG molecules as shown in Example 1 inside.

Figure 12:
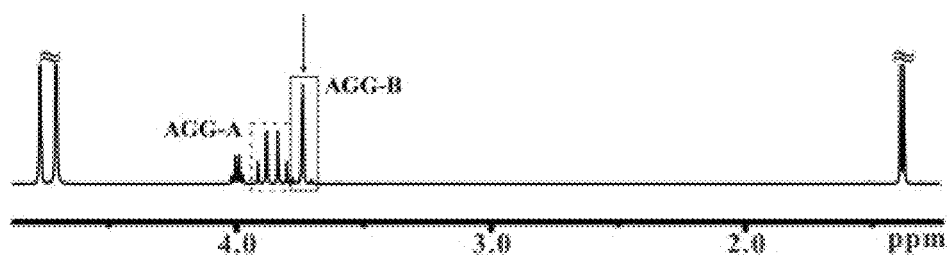
FIG. 12 shows the single-pulse $^1$H spectrum of the sample shown in FIG. 11 of the present invention, the spectrum includes the water signals and the H spin signals in the AGG molecules. The magnetic resonance signals in the dashed frame in the spectrum come from group AGG-A, and the magnetic resonance signals in the solid frame in the spectrum come from group AGG-B.

The Specific Steps are as Follows:

A 90° pulse was applied to obtain the single-pulse $^1$H spectrum of the sample as shown in FIG. 11. The signal was calibrated by TMS. The magnetic resonance signals shown in FIG. 12 are attributed as follows, the chemical shift of the water peak in the nuclear magnetic tube is 4.70 ppm, the chemical shift of the water peak in the capillary is 4.6 ppm, the chemical shift of group AGG-A is 3.95 ppm, the chemical shift of group AGG-B is 3.79 ppm, and the chemical shift of the methyl proton in the AGG molecule is 1.48 ppm, and the chemical shift of the hydrogen spins H in the AGG molecule is 4.08 ppm. The J-coupling value between the two H spins of group AGG-A is 17.2 Hz, and the J-coupling value between the two H spins of group AGG-B is 17.7 Hz.

Figure 13:
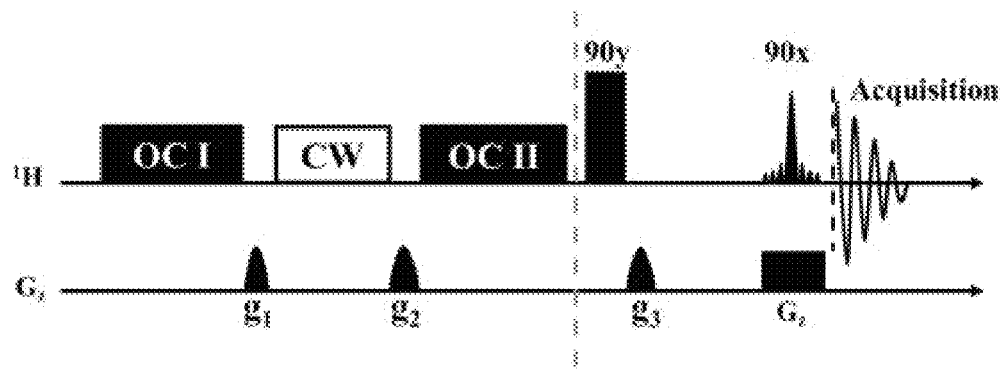
FIG. 13 shows the MRS pulse sequence used for the simultaneous selective observation of the magnetic resonance signals of group AGG-A and group AGG-B of the AGG molecules in the experiment of Example 3 of the present invention.
Figure 14:
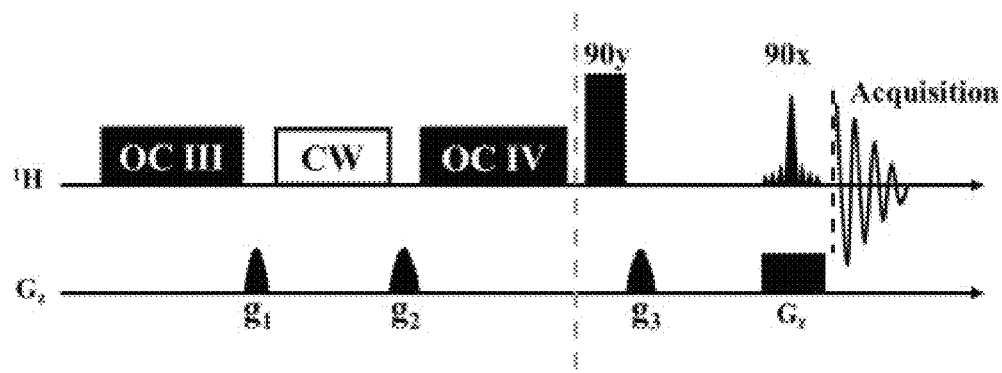
FIG. 14 shows the MRS pulse sequence used for selective observation of the magnetic resonance signals of group AGG-B in the AGG molecule in the experiment of Example 3 of the present invention.
Figure 17:
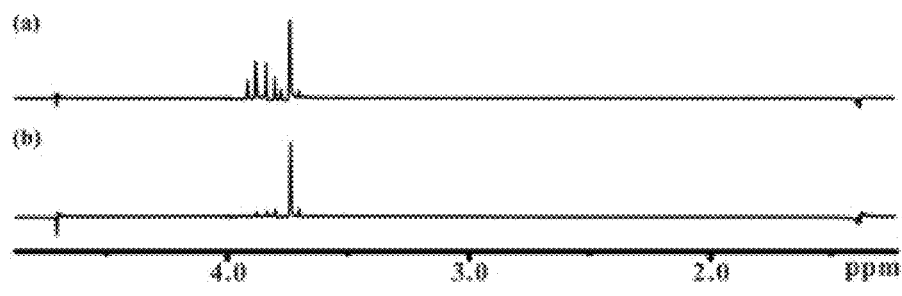
FIG. 17(*a*) shows the MRS spectrum obtained by applying the pulse sequence in FIG. 13 to the sample shown in FIG. 11. In the spectrum, there are mainly group AGG-A and group AGG-B magnetic resonance signals.

The implementation process of Example 1 is combined with the conventional magnetic resonance spectroscopy technology, i.e., applying the pulse sequences shown in FIG. 13 and FIG. 14. The experimental results are shown in FIG. 17. FIG. 17(a) shows the MRS spectrum obtained by applying the pulse sequence in FIG. 13 to the sample shown in FIG. 11. Compared with FIG. 12, in FIG. 17(a), there are mainly the magnetic resonance signals of group AGG-A and group AGG-B. FIG. 17(b) is the MRS spectrum obtained by applying the pulse sequence in FIG. 14 to the sample shown in FIG. 11. Compared with FIG. 12, in FIG. 17(b), only the magnetic resonance signal of AGG-B is present.

The optimal experimental parameters in the experiment are as follows, the application time of multiple singlet preparation pulse OCI is 230 ms and the power is 29.49 dB, the application time of multi-singlet observation pulse OCII is 230 ms and the power is 29.49 dB, the application time of singlet preparation pulse OCIII is 180 ms and the power is 29.49 dB, the application time of singlet observation pulse OCIV is 180 ms and the power is 29.49 dB. The duration of the gradient pulse $g_1$ is 1.1 ms and the intensity is 6.8 mT/cm. The duration of the gradient pulse $g_2$ is 1.1 ms and the intensity is 12 mT/cm. The duration of the gradient pulse $g_3$ is 1 ms and the intensity is 18 mT/cm. The time of the decoupling pulse can be optimized according to the actual situation.

Figure 15:
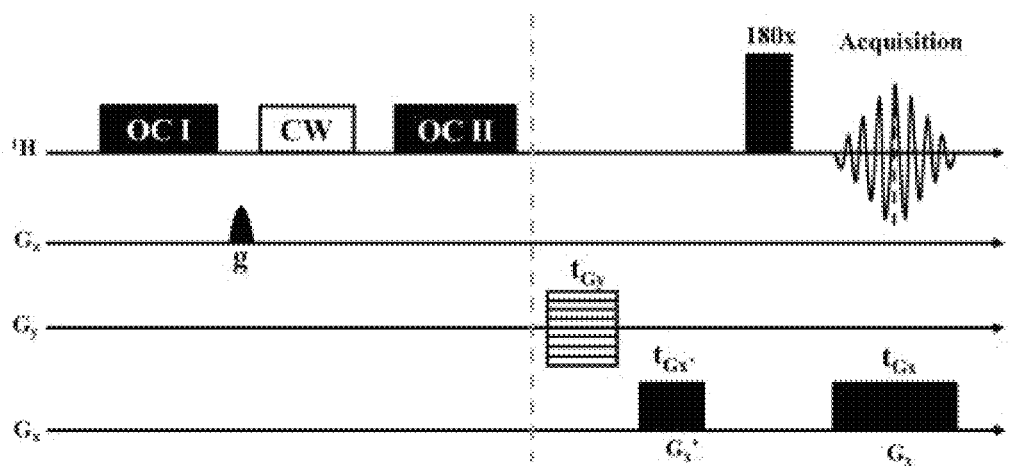
FIG. 15 shows the MRI pulse sequence used for simultaneous selective observation of the magnetic resonance signals of group AGG-A and group AGG-B of the AGG molecule in the experiment of Example 3 of the present invention.
Figure 16:
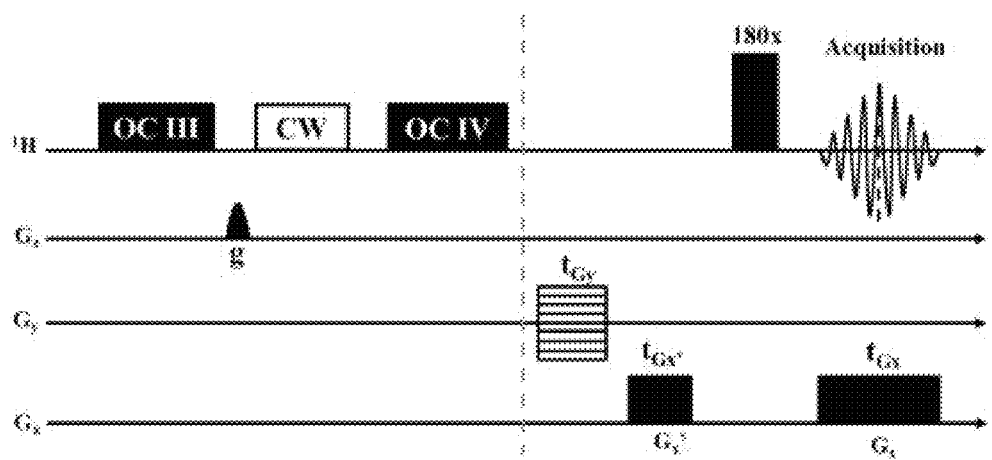
FIG. 16 shows the MRI pulse sequence used for selective observation of the magnetic resonance signals of group AGG-B of the AGG molecule in the experiment of Example 3 of the present invention.
Figure 18:
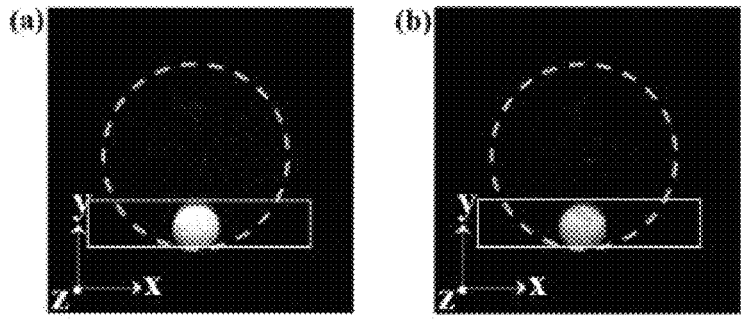
FIG. 18(*a*) shows the MRI image obtained by applying the pulse sequence in FIG. 15 to the sample shown in FIG. 11. The white dashed line in the figure represents the outline of the nuclear magnetic tube, and the area within the white rectangular solid frame is used for the signal intensity comparison. The small white solid circle is the signal of AGG deuterium aqueous solution in the capillary inside the nuclear magnetic tube.

The implementation process of Example 1 is combined with the conventional magnetic resonance imaging technology, i.e. applying the pulse sequences shown in FIG. 15 and FIG. 16. The experimental results are shown in FIG. 18. The FIG. 18(a) shows the MRI image obtained by applying the pulse sequence shown in FIG. 15 to the sample shown in FIG. 11. The white dashed line in the figure represents the outline of the nuclear magnetic tube, and the area within the white rectangular solid line frame is used for signal intensity comparison. The small white solid circle is the signal of the liquid in the capillary inside the nuclear magnetic tube. Since the AGG molecules exist only in the capillary, only the small solid white circle appears in FIG. 18(a) by applying the pulse sequence in FIG. 15. FIG. 18(b) shows the MRI image obtained by applying the pulse sequence shown in FIG. 16 to the sample shown in FIG. 11. Similarly, the white dashed line in the figure represents the outline of the nuclear magnetic tube, and the area within the white solid rectangular box is used for signal intensity comparison. The small white solid circle is the signal of the liquid in the capillary inside the nuclear magnetic tube. By applying the pulse sequence in FIG. 16, only a small solid white circle appears in FIG. 18(b). Since the signals of the small white solid circle in FIG. 18(a) come from group AGG-A and group AGG-B, while the signals in FIG. 18(b) only come from group AGG-B, the signals of the small white solid circle in FIG. 18(b) are significantly weaker than those of the small white solid circle in FIG. 18(a).

Figure 19:
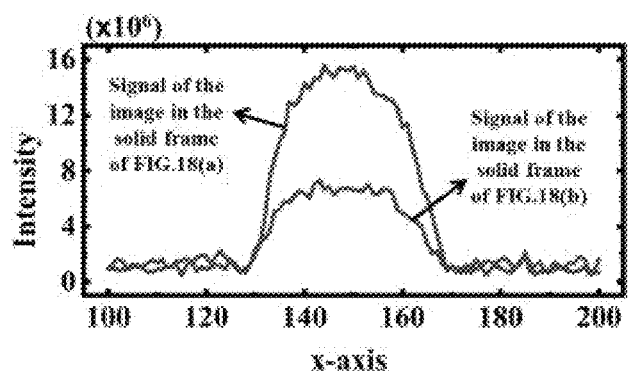
FIG. 19 shows the comparison of the magnetic resonance signal intensity between preparing two singlets and preparing one singlet. By comparison, it is found that when preparing a single state signal by simultaneously selecting group AGG-A and group AGG-B for imaging, the signal intensity is about twice that of when only selecting group AGG-B signal for imaging.

FIG. 19 compares the magnetic resonance signal intensity between FIG. 18(a) and FIG. 18(b). The selected comparison area is shown in the solid frame in FIG. 18. By comparison, it is found that when preparing a single state signal for imaging by simultaneously selecting group AGG-A and group AGG-B, the signal intensity is about twice that of when only selecting group AGG-B signal for imaging. This clearly demonstrates that simultaneous preparation of the multiple singlet signals can realize the enhancement of the molecular selective magnetic resonance imaging signals.

The above is only the preferred embodiments of the present invention, and the protection content of the present invention is not limited to the above embodiments. Among them, the preparation and detection pulses suitable for the multiple spin singlets are not limited to the optimized pulse methods. The present invention protects the conventional pulse sequences based on the state conversion method of the multiple spin coupling system as claimed in Step i and Step iii of claim 1 or the numerical pulse sequences based on other optimization methods. The pulse sequence includes the preparation detection pulse sequences for simultaneously preparing the singlet of different groups in a molecule, the preparation detection pulse sequences for simultaneously preparing the singlet of different molecules, the multiple singlet pulse sequence for magnetic resonance spectroscopy, and the multiple singlet pulse sequence for magnetic resonance imaging.

The protection content of the present invention is not limited to the above embodiments. Without departing from the spirit and scope of the concept of the present invention, any changes and advantages that can be thought of by the skilled in the field are included in the present invention, and are protected by the appended claims.

What is claimed is:

1. A pulse sequence method for realizing selective detection of multiple groups and/or molecules by simultaneously preparing nuclear spin singlets and/or singlet orders of the multiple groups and/or molecules, wherein, said method realizes precise excitation of multi-frequency magnetic resonance signals by utilizing optimization control methods, realizes the simultaneous selective detection of magnetic resonance signals of the multiple groups and/or molecules by simultaneously preparing the nuclear spin singlets and/or singlet orders of the multiple groups and/or the molecules, said method comprises the following core steps:

Step i: simultaneously converting multiple groups and/or molecules from a thermal equilibrium state into a singlet and/or singlet orders through the pulses;

Step ii: eliminating the non-singlet and/or non-singlet orders signals in the system by applying the gradient field;

Step iii: simultaneously converting the nuclear spin singlets and/or singlet orders of the multiple groups and/or molecules into the observable states and collecting the magnetic resonance signals, and realizing simultaneous selective observation of multiple groups and/or molecules.

2. The method of claim 1, wherein, in said step i, the m (m≤N/2) pairs of spins in a nuclear spin system which include the N spin quantum numbers of ½ are simultaneously converted into the nuclear spin singlets and/or singlet orders by applying reasonably designed pulses, that is, the state of the m pairs of spins in the system being transformed from the thermal equilibrium state of $I_z^1+I_z^2+\ldots+I_z^{2m}$ to the state of $2I_x^1 I_x^2+2I_y^1 I_y^2+2I_x^3 I_x^4+2I_y^3 I_y^4+\ldots+2I_x^{2m-1} I_x^{2m}+2I_y^{2m-1} I_y^{2m}$.

3. The method of claim 1, wherein, in said step ii, the pulsed gradient field is used to eliminate or suppress the signals other than the nuclear spin singlets and/or singlet orders, realizing the selective observation of the multiple nuclear spin singlets and/or singlet orders; adjusting the intensity, the application times and the positions of the pulsed gradient field realizes the optimization of the selective observation of the multiple singlet magnetic resonance signals.

4. The method of claim 1, wherein, in said step iii, by applying the reasonably designed pulses, the m pairs of spins in the nuclear spin singlets and/or singlet orders are converted from the state of $2I_x^1 I_x^2+2I_y^1 I_y^2+2I_x^3 I_x^4+2I_y^3 I_y^4+\ldots+2I_x^{2m-1} I_x^{2m}+2I_y^{2m-1} I_y^{2m}$ into the state of $I_{x/y}^1+I_{x/y}^2+\ldots+I_{x/y}^{2m}$, and the magnetic resonance signals are collected to obtain the magnetic resonance signals of the specific groups and/or molecules.

5. The method of claim 1, wherein, said pulse sequences include the preparation and detection pulse sequence for simultaneously preparing the nuclear spin singlets and/or singlet orders of different groups in a molecule, the preparation and detection pulse sequence for simultaneously preparing the nuclear spin singlets and/or singlet orders of different molecules, the multiple signals selective magnetic resonance spectroscopy pulse sequence for the same molecule, and the multiple signals selective magnetic resonance imaging pulse sequence for the same molecule.

6. The method of claim 5, wherein, said preparation and detection pulse sequence for simultaneously preparing the nuclear spin singlets and/or singlet orders of the different groups in a molecule includes the pulse module OCI, the pulse module OCII, the pulsed gradient field g and the continuous wave CW decoupling pulse; said pulse module OCI is used to simultaneously convert the spin system composed of H atoms in different groups in the same molecule from the thermal equilibrium state into the nuclear spin singlets; said pulse module OCII is used to simultaneously convert the nuclear spin singlets prepared by the pulse module OCI into the observable states; said pulsed gradient field g is used to eliminate or suppress the signals other than the nuclear spin singlets and/or singlet orders; said continuous wave CW decoupling pulse is used to preserve the singlet state.

7. The method of claim 5, wherein, said preparation and detection pulse sequence for simultaneously preparing the nuclear spin singlets and/or singlet orders of different molecules includes the pulse module OCI', the pulse module OCII', the pulsed gradient field $g_1$ and $g_2$, and the continuous wave CW decoupling pulse; said pulse module OCI' is used to convert the spin system composed of H atoms in different groups in different molecules from the thermal equilibrium state into the nuclear spin singlets and/or singlet orders; said pulse module OCII' is used to simultaneously convert the nuclear spin singlets and/or singlet orders prepared by the pulse module OCI' into the observable states; said pulsed gradient field $g_1$ and $g_2$ are used to eliminate or suppress the signals other than the nuclear spin singlets and/or singlet orders; said continuous wave CW decoupling pulse is used to preserve the singlet state.

8. The method of claim 5, wherein, said multiple signals selective magnetic resonance spectroscopy pulse sequence for the same molecule includes the pulse module OCI, the pulse module OCII, the pulsed gradient field $g_1/g_2/g_3$, the continuous wave CW decoupling pulse, the 90° hard pulse with the phase in the y direction, the soft pulse of sinc waveform with the phase in the x direction and the layer selection gradient $G_z$; said pulse module OCI is used to simultaneously convert the spin system composed of H atoms in different groups in the same molecule from the thermal equilibrium state into the nuclear spin singlets; said pulse module OCII is used to simultaneously convert the nuclear spin singlets prepared by the pulse module OCI into the observable state in the x direction; said pulsed gradient fields $g_1/g_2/g_3$ are used to eliminate or suppress the signals other than nuclear spin singlets and/or singlet orders; said continuous wave CW decoupling pulse is used to preserve the singlets; said 90° hard pulse with the phase in the y direction converts the observable state after the action of the pulse module OCII into the longitudinal magnetization; said soft pulse of sinc waveform and the layer selection gradient $G_z$ are simultaneously applied for layer selection excitation of the spin system in the longitudinal magnetization; said layer selection gradient $G_z$ is a linear gradient field.

9. The method of claim 5, wherein, said multiple signals selective magnetic resonance imaging pulse sequence for the same molecule includes the pulse module OCI, pulse module OCII, the pulsed gradient field g, the continuous wave CW decoupling pulse, the phase coding gradient $G_y$, the π refocusing pulse, the dephasing wave $G_x'$, the rephasing wave $G_x$; said pulse module OCI is used to simultaneously convert the spin system composed of H atoms in different groups in the same molecule from the thermal equilibrium state into the nuclear spin singlets; said pulse module OCII is used to simultaneously convert the nuclear spin singlets prepared by the pulse module OCI into the observable state in the x direction; said pulsed gradient field g is used to eliminate or suppress the signals other than nuclear spin singlets and/or singlet orders; said continuous wave CW decoupling pulse is used to preserve the singlet states; said phase coding gradient $G_y$ makes the H spins in the phase coding direction have different phases, thus determining the positions of different magnetic resonance signal sources along the phase coding direction; said dephasing wave $G_x'$ is a linear gradient field, applied prior to the π refocusing pulse to obtain a positive phase difference, said phase difference remains unchanged before the π refocusing pulse is applied; said π refocusing pulse is a 180° pulse applied in the x direction, used to flip the phase difference obtained by the dephasing wave $G_x'$ to the negative direction, and then the phase difference remains unchanged; meanwhile, the π refocusing pulse is also used to compensate for the phase loss caused by the external magnetic field and the chemical shift non-uniformity; said rephasing wave $G_x$ is a linear gradient field, used to return the spin to the same phase, and said phase difference becomes zero at the echo time TE, followed by the phase difference occurring again; said dephasing wave $G_x'$ and said rephasing wave $G_x$ together form a complete frequency coding gradient, so that the H spins in the frequency coding direction has different frequencies.

10. The method of claim 6, wherein, the application time of said pulse module OCI is 230 ms, the power is 29.45 dB; the application time of said pulse module OCII is 230 ms, the power is 29.45 dB, the duration of said gradient field pulse g is 1.3 ms, the intensity of the gradient field pulse g is 6.8 mT/cm; the time of the CW decoupling pulse is adjusted according to the demand.

11. The method of claim 7, wherein, the application time of said pulse module OCI' is 100 ms, the power is 29.65 dB; the application time of said pulse module OCII' is 100 ms, the power is 29.65 dB, the duration of said gradient field pulse $g_1$ is 1 ms, the intensity of the gradient field pulse is 2.4 mT/cm; the duration of said gradient field pulse $g_2$ is 1 ms, the intensity of the gradient field pulse is 7 mT/cm; the time of the CW decoupling pulse is adjusted according to the demand.

12. The method of claim 8, wherein, the application time of said pulse module OCI is 230 ms, the power is 29.10 dB; the application time of said pulse module OCII is 230 ms, the power is 29.10 dB; the duration of said gradient field pulse $g_1$ is 1.1 ms, the intensity of said gradient field pulse is 2.2 mT/cm; the duration of said gradient field pulse $g_2$ is 1.1 ms, the intensity of the gradient field pulse is 4.4 mT/cm; the duration of said gradient field pulse $g_3$ is 1 ms, the intensity of the gradient field pulse is 6.6 mT/cm; the application time of 90° hard pulse with the phase in the y direction is 9.4 μs, the power is −13.38 dB; the application time of the soft pulse of sinc waveform is 1 ms, the power is 36.31 mW; the application time of said layer selection gradient $G_z$ is 1 ms, the intensity is 0.1 mT/cm.

13. The method of claim 9, wherein, the application time of said pulse module OCI is 230 ms, the power is 32.7 dB; the application time of said pulse module OCII is 230 ms, the power is 32.7 dB; the duration of said gradient field pulse g is 1.1 ms, the intensity of the gradient field pulse is 8.8 mT/cm; the application time of said phase coding gradient $G_y$ is 3.09 ms, the maximum intensity is 1.6 mT/cm; the application time of said dephasing gradient $G_x'$ $t_{Gx'}$=3.27 ms, the intensity is 4.9 mT/cm; the application time of said I refocusing pulse is 18.8 μs, the power is −13.38 dB; the application time of said rephasing wave $G_x$ $t_{Gx}$=6.53 ms, the intensity is 4.9 mT/cm; the repetition time TR=4.47 s, the echo time TE=9.65 ms, the field of view FOV=(5.8×5.8) mm², the resolution is 45×45 μm², 305×305 matrix.

14. An application of the method of claim 1 in simultaneously preparing the nuclear spin singlets and/or singlet orders of the multiple groups and/or molecules, realizing selective detection of multiple groups and/or molecules, improving the signal intensity of molecularly targeted magnetic resonance imaging.

15. An application of the method of claim 2 in simultaneously preparing the nuclear spin singlets and/or singlet orders of the multiple groups and/or molecules, realizing selective detection of multiple groups and/or molecules, improving the signal intensity of molecularly targeted magnetic resonance imaging.

16. An application of the method of claim 3 in simultaneously preparing the nuclear spin singlets and/or singlet orders of the multiple groups and/or molecules, realizing selective detection of multiple groups and/or molecules, improving the signal intensity of molecularly targeted magnetic resonance imaging.

17. An application of the method of claim 4 in simultaneously preparing the nuclear spin singlets and/or singlet orders of the multiple groups and/or molecules, realizing selective detection of multiple groups and/or molecules, improving the signal intensity of molecularly targeted magnetic resonance imaging.

18. An application of the method of claim 5 in simultaneously preparing the nuclear spin singlets and/or singlet orders of the multiple groups and/or molecules, realizing selective detection of multiple groups and/or molecules, improving the signal intensity of molecularly targeted magnetic resonance imaging.

19. An application of the method of claim 6 in simultaneously preparing the nuclear spin singlets and/or singlet orders of the multiple groups and/or molecules, realizing selective detection of multiple groups and/or molecules, improving the signal intensity of molecularly targeted magnetic resonance imaging.

20. An application of the method of claim 7 in simultaneously preparing the nuclear spin singlets and/or singlet orders of the multiple groups and/or molecules, realizing selective detection of multiple groups and/or molecules, improving the signal intensity of molecularly targeted magnetic resonance imaging.

* * * * *